United States Patent
Adkinson et al.

(10) Patent No.: US 11,842,444 B2
(45) Date of Patent: Dec. 12, 2023

(54) VISUALIZATION OF CAMERA LOCATION IN A REAL-TIME SYNCHRONIZED 3D MESH

(71) Applicant: STREEM, LLC, Portland, OR (US)

(72) Inventors: Sean M. Adkinson, North Plains, OR (US); Teressa Chizeck, Portland, OR (US); Ryan R. Fink, Vancouver, WA (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/336,797

(22) Filed: Jun. 2, 2021

(65) Prior Publication Data

US 2022/0392167 A1 Dec. 8, 2022

(51) Int. Cl.
*G06T 17/20* (2006.01)
*G06T 7/593* (2017.01)
*G06T 7/73* (2017.01)
*G06T 19/00* (2011.01)

(52) U.S. Cl.
CPC ............ *G06T 17/205* (2013.01); *G06T 7/593* (2017.01); *G06T 7/73* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 2002/0140698 A1* | 10/2002 | Robertson | G06F 3/04815 345/427 |
| 2005/0028111 A1* | 2/2005 | Schrag | G06F 3/04815 715/848 |
| 2008/0292213 A1* | 11/2008 | Chau | G06F 16/58 382/294 |
| 2010/0120422 A1* | 5/2010 | Cheung | H04W 4/023 455/434 |
| 2015/0187128 A1* | 7/2015 | Jones | G06T 15/506 345/426 |
| 2018/0046874 A1* | 2/2018 | Guo | G06T 7/74 |
| 2018/0143756 A1* | 5/2018 | Mildrew | G06F 3/0482 |
| 2018/0336724 A1* | 11/2018 | Spring | G06F 3/04845 |
| 2019/0340836 A1* | 11/2019 | Lynen | G06T 19/006 |
| 2020/0042278 A1* | 2/2020 | Eade | G06F 3/04815 |

(Continued)

OTHER PUBLICATIONS

Andrew J. Davidson, Ian D. Ried, Nicholas D. Molton, Olivier Stasse, "MonoSlam: Real-Time Single Camera Slam", 2007, IEEE Transactions on Pattern Analysis and Machine Intelligence, 29(6): 1052-1067 (Year: 2007).*

(Continued)

*Primary Examiner* — Michael J Cobb
(74) *Attorney, Agent, or Firm* — Schwabe Williamson & Wyatt

(57) ABSTRACT

Embodiments include systems and methods for visualizing the position of a capturing device within a 3D mesh, generated from a video stream from the capturing device. A capturing device may provide a video stream along with point cloud data and camera pose data. This video stream, point cloud data, and camera pose data are then used to progressively generate a 3D mesh. The camera pose data and point cloud data can further be used, in conjunction with a SLAM algorithm, to indicate the position and orientation of the capturing device within the generated 3D mesh.

16 Claims, 7 Drawing Sheets

(56) References Cited

U.S. PATENT DOCUMENTS

| | | | | |
|---|---|---|---|---|
| 2020/0357132 | A1* | 11/2020 | Jovanovic | G06T 7/80 |
| 2021/0097714 | A1* | 4/2021 | Grundhoefer | G06K 7/1417 |
| 2021/0183080 | A1* | 6/2021 | Hoiem | G06T 3/0068 |
| 2021/0343085 | A1* | 11/2021 | Chakravarthi | G06N 20/00 |
| 2021/0358150 | A1* | 11/2021 | Lin | G01S 7/4813 |
| 2022/0343597 | A1* | 10/2022 | Moore | G08G 1/096827 |
| 2023/0033201 | A1* | 2/2023 | Ogasawara | G06F 3/04845 |
| 2023/0062973 | A1* | 3/2023 | Onuma | G06T 19/006 |

OTHER PUBLICATIONS

Yun-Jia Yeh, Huei-Yung Lin, "3D Reconstruction and Visual Slam of Indoor Scenes for Augmented Reality Application", 2018, IEEE 14th International Conference on Control and Automation (ICCA), pp. 94-99 (Year: 2018).*

Zachary Teed, Jia Deng, "Droid-Slam: Deep Visual Slam for Monocular, Stereo, and RGB-D Cameras", May 2021, 35th Conference on Neural Information Processing Systems (NeurIPS 2021), retrieved from "https://openreview.net/forum?id=ZBfUo_dr4H" (Year: 2021).*

* cited by examiner

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 7

VISUALIZATION OF CAMERA LOCATION IN A REAL-TIME SYNCHRONIZED 3D MESH

TECHNICAL FIELD

The present disclosure relates to the field of augmented reality (AR), and specifically to visualizing the location of a remote camera within a 3D mesh that is synchronized with the remote camera.

BACKGROUND

Devices such as smartphones and tablets are increasingly capable of supporting augmented reality ("AR"). These devices may capture images and/or video and, depending upon the particulars of a given AR implementation, either the captured images or video may be processed to derive a point cloud of depth data for each frame, and/or depth data may be directly sensed by the device if equipped with a suitable sensor. This point cloud enables AR-based applications to generate and place virtual objects within a 3-D space represented by the captured images and/or video. These point clouds may be associated and stored with their source images, video, and/or depth or motion data. Furthermore, the point cloud information, along with other AR-related data as well as image data such as video streams and/or still pictures can be transmitted to a remote server or other device. The remote server or device can use the transmitted information to generate a 3D mesh representation of the subject or environment captured by the device.

A device that supports AR typically provides an AR session on a device-local basis (e.g., not requiring communication with a remote system), such as allowing a user of the device to capture a video using a camera built into the device, and superimpose AR objects upon the video as it is captured. Support for superimposing AR objects is typically provided by the device's operating system, with the operating system providing an AR application programming interface (API). Examples of such APIs include Apple's ARKit, provided by iOS, and Google's ARCore, provided by Android.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 7 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
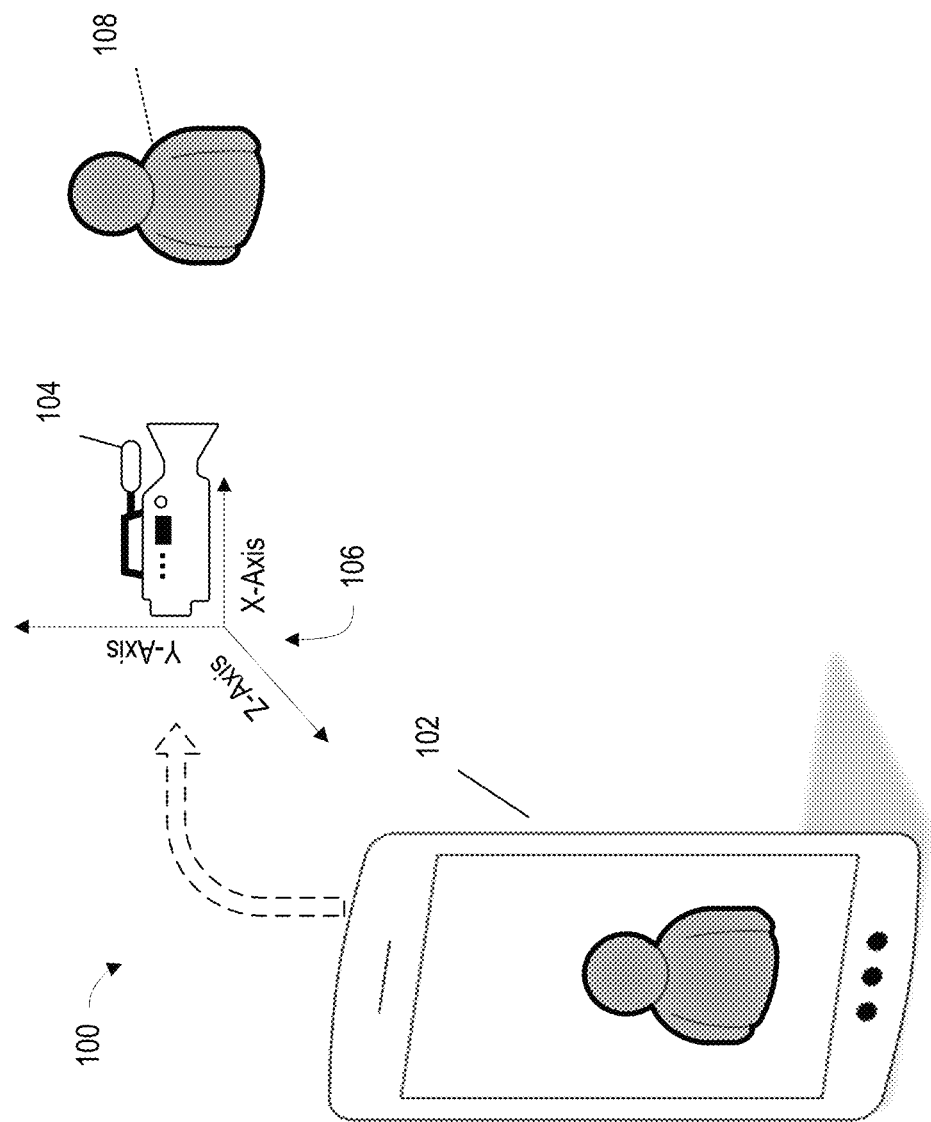
FIG. 1 illustrates a block diagram of the components of a system for capturing an image and corresponding AR data, according to various embodiments.

In the following detailed description, reference is made to the accompanying drawings which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to,"

the term "having" should be interpreted as "having at least," the term "includes" should be interpreted as "includes but is not limited to," etc.).

Call-outs for components that are present in multiples may be numbered identically, with a letter suffix distinguishing each instance of the multiple component. For example, where a component 1 is present multiple times in a figure, each instance of component 1 may be designated 1*a*, 1*b*, 1*c* . . . 1*x*. Referring to a component by its call-out without the letter, e.g. component 1, should be understood to refer to any or all instances of component 1*a*-1*x*, while reference to a specific instance of a component 1 will include its letter, e.g. component 1*b*.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Augmented reality APIs typically use both a stream of frames captured by the device camera as well as other available motion data, such as a gyroscope and/or accelerometers contained within the device, to compute a point cloud. The available motion data also includes camera pose data that allows the camera pose, namely, the position (e.g. x-y-z position) and orientation (e.g. rotation or direction the camera is facing) of the camera in space relative to its surrounding environment, to be determined as the device moves. Knowing the camera pose helps establish an accurate point cloud when using a handheld or similar mobile device that may move while simultaneously capturing the surrounding environment.

By combining point cloud data with captured images and/or video and any AR information, useful structures, such as a 3D mesh and/or 3D scene graph, representing the world detected by the capturing device can be generated. By combining point cloud data with images from the video, the 3D mesh can be subsequently rendered as a model of the detected world. Further, by correlation of each frame in the video with its captured AR data, the image information from each frame can be mapped upon the 3D mesh, to effectively create a relatively photo-accurate 3D model of the world captured by the capturing device. This 3D model, in embodiments, can be manipulated in a 3D environment and viewed from perspectives different from the original capturing device.

Most devices capable of capturing point cloud data are further capable of network communications with a remote device or server. The device may transmit the point cloud data along with other relevant data, such as point cloud data, over the network to the remote device or server, allowing the remote device or server to compute the aforementioned 3D mesh, and/or to facilitate insertion and/or manipulation of AR objects. By use of a remote device or server, a two-way interactive session can be established between a user of a device capturing an environment and associated depth data/point cloud, and a remote user, where the remote system generates a 3D mesh on the fly from information transmitted from the capturing device. The remote user may be able to manipulate the 3D mesh and examine the mesh from various angles that may differ from the current view of the capturing device, e.g. the view seen by the user of the capturing device as it captures the video. For example, the capturing device may be oriented and pointed to a corner of a room, while the remote user may be inspecting an opposite corner of the room, i.e. a portion of the room that may be completely behind capturing device's (and user of the capturing device's) view.

In some situations, the remote user may desire to instruct a user of the capturing device to position the device camera at a desired location, such as when guiding the user of the capturing device in completing a task, or when the remote user needs to more closely inspect a portion of the capturing device's environment that is inadequately reflected in the 3D mesh, to name two possible examples. To accurately provide such instructions, it is useful for the camera pose to be visualized relative to the 3D mesh, allowing the remote user to be aware of the capturing device's position and orientation, and facilitating the remote user to provide accurate directions to the user of the capturing device. Furthermore, such visualization of the capturing device's position relative to the 3D mesh is useful where the captured environment may have a plurality of identical features such that determining position within the environment is not easily accomplished by just viewing the video stream transmitted from the capturing device.

Disclosed embodiments include systems and methods for indicating a capturing device's location and orientation (i.e. camera pose) within a 3D mesh that is being generated from a data stream, camera pose data, and/or depth data being transmitted from the capturing device. The position relative to the mesh is represented within the mesh on the remote user's display, such as with a graphic widget. The widget may be a ball or other suitable object, with a cone, arrow, or other directional indication extending from the ball to indicate the orientation of the camera, including the direction the camera is facing as well as any camera pan, tilt, and/or yaw. As the capturing device moves, the position and orientation indicated by the widget likewise moves and rotates in approximate real-time to continually indicate the current position and orientation of the capturing device. In some embodiments, the widget may scale in size or deform to indicate possible uncertainty in the position and pose of the capturing device, e.g. the ball may expand to indicate a greater uncertainty in x-y-z position and/or the cone may expand to indicate a greater uncertainty in camera pose. Other possible embodiments will be described herein as appropriate.

FIG. 1 illustrates an example system 100 that may enable capture of an image or video that includes AR data. System 100 may include a device 102. In the depicted embodiment of FIG. 1, device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of device 102. Where device 102 is implemented as a smartphone or tablet, camera 104 may be one or more built-in cameras. In other embodiments, such as where consumer device is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102. In other embodiments, such as where consumer device 102 is equipped with multiple cameras or similar sensors, one or more of the sensors may be configured to directly detect depth points, such as a 3D camera, LI DAR, or other suitable depth-sensing technology.

Spatial position sensor 106 may be configured to provide positional information about the pose of camera 104, such as camera 104's rotation, pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
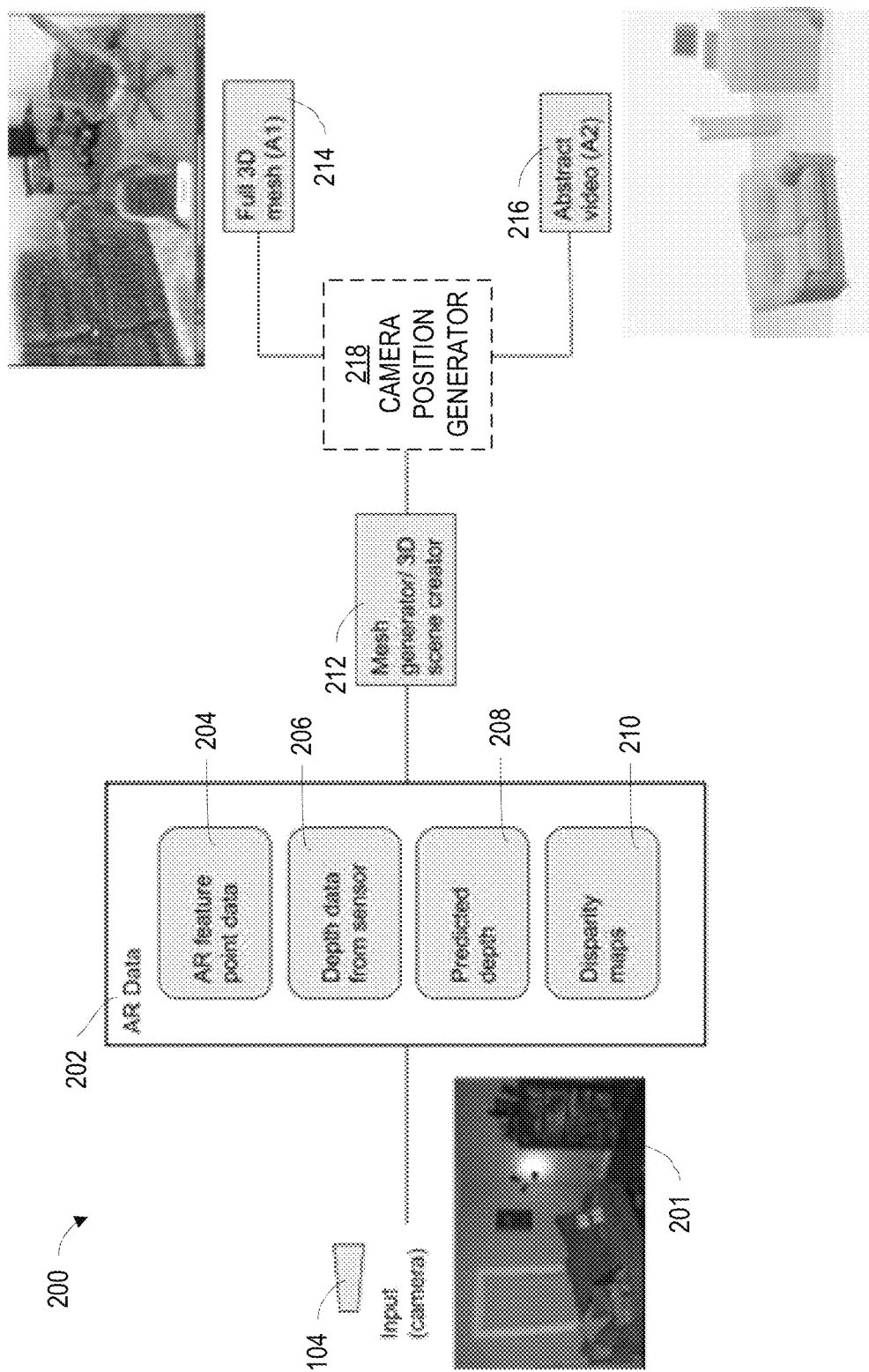
FIG. 2 depicts an example high-level process flow for generating a full 3D mesh from a captured video and associated AR data, according to various embodiments.

FIG. 2 depicts an example process flow 200, according to embodiments, for the capture of a video and associated AR data, and subsequent processing of the video and data into a 3D mesh and abstract video. Process flow 200 may be performed in whole or in part on the capturing device, such as device 102; on a remote device in direct two-way communication with the capturing device that may be operated by a remote service provider; and/or on a remote or central server, e.g. cloud service, that acts as an intermediary between the capturing device and a remote device operated by the service provider. Various portions of process flow 200 may be performed on a combination of the capturing device, the remote device, or the central server/cloud service, depending on the specifics of a given implementation.

Initially, a video 201 is captured by an input device, such as a camera 104, along with associated motion data (not depicted). This video 201 is then, in embodiments, processed by the AR API of the capturing device (e.g. ARKit, ARCore) to generate AR data 202, which may be tagged to the video 201. Note that, as used herein, AR data 202 is not data about AR objects, rather, AR data 202 is the data that corresponds to video 201 that may be necessary to enable the placement of AR objects within the captured scene. This AR data 202 may then be used to generate a mesh and/or 3D scene by a mesh generator/scene creator 212. Finally, the mesh and/or 3D scene can be used to generate a full 3D mesh 214, which includes frames from the video 201 (and/or other sources of relevant images) mapped upon the 3D mesh 214 to generate a relatively realistic model. Alternatively or additionally, an abstract video 216, which may present an untextured representation of the scene captured by the camera 104, may be generated from the detected points in the point cloud. The model can then be used in an interactive fashion.

In the depicted embodiment of FIG. 2, AR data 202 may be captured contemporaneously with and/or extracted from, video 201, and may be tagged to video 201, potentially on a frame-by-frame basis (discussed in greater detail below). AR data 202 may include AR feature point data 204, depth data from the sensor 206, predicted depth data 208, and/or disparity maps 210. Other embodiments may include additional data types, different data types, or fewer data types. The various types of AR data 202 may be derived from various raw data inputs, including RGB images (such as the sequence of frames of video 201), camera pose information such as camera intrinsics and/or camera transforms (such as from camera 104 and/or spatial position sensor 106), 3D feature points, and/or depth images, among other types of possible data. RGB images may be extracted from frames of the video captured by camera 104. In addition to motion data from spatial position sensor 106, camera intrinsics can include various known or readily determined properties of camera 104, such as focal length, aperture, optical center, angle of view, focal point, etc. For example, knowing the focal point of a camera can allow a rough approximation of distance (depth) to a feature when that feature is in focus. Whether a feature is in focus may be determined by techniques such as edge detection or another contrast-based technique. However, it will be appreciated that, in some instances, only a range of depths may be determined, such as where camera 104 is focused relatively far away from the camera position, and/or the camera 104 utilizes a small aperture (relatively high f-stop, such as f/8, f/11, etc.), so as to offer a large depth of field.

Camera transforms can include the various variables necessary to transform between the 3D objects within the field of view of camera 104 and the 2D image plane of the camera 104. Such variables can include information about the spatial location of the capturing device, which may be useable to render the position of the device 102 within the mesh, as will be discussed in greater detail below. 3D feature points can include feature points useable by the AR API to create the AR feature point data 204, and may be extracted from video 201, such as various anchor points or features, and/or captured using one or more sensors that are separate from video 201, such as spatial position sensor 106. Depth images can include imaging captured by a depth-sensitive device, such as a LI DAR sensor or infrared range finder, to allow for direct, and potentially more precise, depth measurements of various points within the scene captured by camera 104. Where direct depth measurements are available, data similar to that available for camera 104 may be used (e.g., camera intrinsics and camera transforms) to process the depth measurements and correlate with the images from camera 104.

As mentioned above, AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. Depth data from sensor 206 may include the aforementioned direct depth measurements, which may be correlated with identified AR feature point data 204 by the AR API. The depth data may be correlated using any suitable method, such as (but not limited to) tagging the image data of each frame and each frame's corresponding set of depth points (the point cloud for only those points visible within the field of view represented by the frame) with a shared unique ID so that the point cloud can be stored separately from each frame and later reassociated, or tagging the set of depth points to each frame as metadata, or otherwise storing each frame's point cloud with the frame.

A supplement or alternative to depth data from sensor 206 includes predicted depth data 208, which the AR API may derive from any number of techniques, such as machine learning, or photogrammetry and comparison between proximate frames of the captured video. Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/scene creator 212, in embodiments, receives the AR data 202 and uses it to generate a 3D mesh, which may then be output as a full 3D mesh 214 and/or an abstract video 216. The mesh generator 212 may further indicate within the generated mesh the location and orientation of the device 102, as will be discussed below in more detail with respect to FIG. 3. Alternatively, in other embodiments a separate camera position generator 218 (illustrated in dashed lines to indicate its optional nature) may be included in the flow depicted in FIG. 2, to determine and indicate within the full 3D mesh 214 and/or the abstract video 216 generated by mesh generator 212

The resulting output from the mesh generator/scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. Such mapping requires that the AR data 202 be correlated to each frame from the video 201. Mapping the RGB image from various frames of video 201 effectively stitches the frames together as they are mapped onto the 3D mesh. The full 3D mesh 214 provides a geometric representation of the captured scene. The full 3D mesh 214 can be used for various purposes, such as simulating physical interactions with objects in the environment represented by the full 3D mesh 214, taking measurements of the represented environment, later exploration or walkthrough, or another suitable purpose. Also or alternatively, an abstract video 216 can be output.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL, CMYK, or another method of expressing color, in alternative embodiments. In still other embodiments, the image information may comprise black and white or greyscale information, with no color information. Further still, other embodiments may utilize a combination of color and greyscale/black and white images.

The abstract video 216 may essentially reproduce the original video captured from camera 104, but with frames generated by rendering objects from the 3D mesh. In some embodiments, the original RGB images from each frame may not be texture mapped to the rendered objects, providing additional abstraction. By not mapping the RGB images, the resulting abstracted video 216 depicts the 3D objects captured by the point cloud in an abstract fashion, as a collection of generic objects. Each frame of the original video may be reproduced based on the correlated AR data 202 associated with the original frame.

The various components of process flow 200 may be implemented, as suitable, in hardware, software, or combination of hardware and software. Where implemented in hardware, one or more components of process flow 200 may be implemented using discrete components and/or integrated circuits such as a field-programmable gate array (FPGA) or application-specific integrated circuit (ASIC), or a combination of the foregoing. Where implemented in software, the software may be executed on one or more processors, which may be general-purpose processors, or purpose-built, such as an embedded microcontroller. The software may be partially or wholly implemented as firmware.

Figure 3:
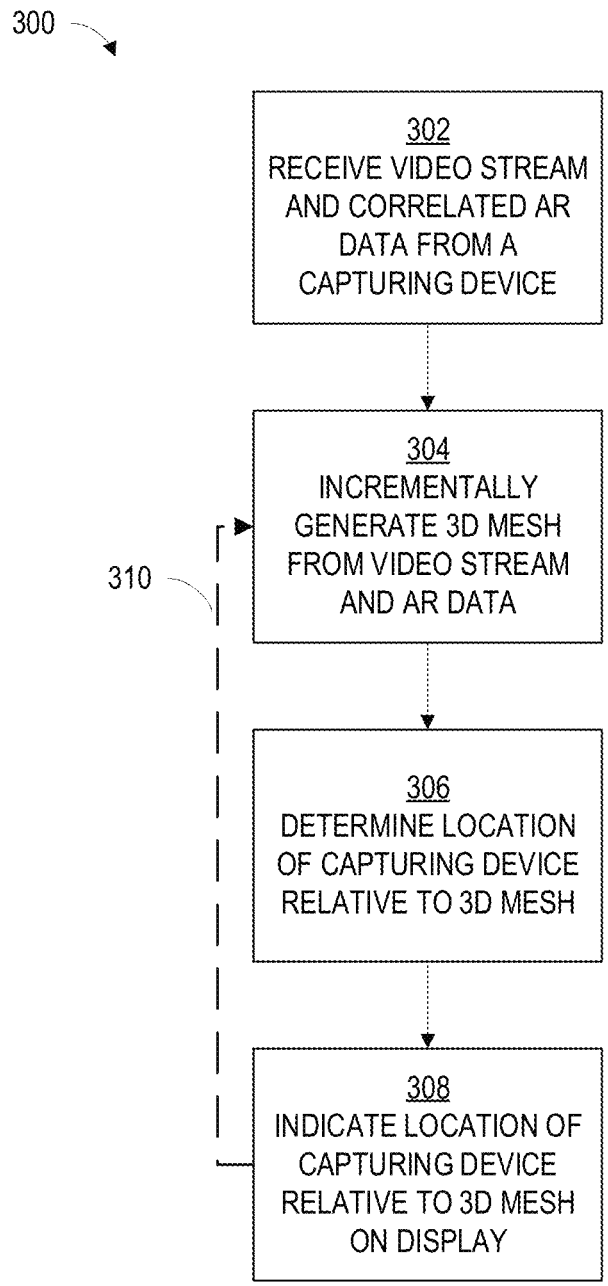
FIG. 3 is a flowchart of the operations of an example method for generating and indicating the position of a capturing device within a 3D mesh generated from capturing device data, according to various embodiments.

FIG. 3 depicts an example method 300 for calculating and displaying the position of a capturing device, such as device 102 with camera 104, within a 3D mesh that is generated from video and depth data captured by the capturing device, according to various embodiments. Method 300 may be carried out as part of process flow 200, or as a separate process. Method 300 may be carried out by a mesh generator, such as mesh generator 212, which also generates the 3D mesh from the capturing device data, or by a dedicated module such as camera position generator 218. Method 300 may be carried out in whole or in part, and various operations may be omitted or added, depending upon the specifics of a given implementation. In embodiments, method 300 may be carried out at least in part by a remote server, such as a server that facilitates communications between device 102 and a remote device, and/or as part of a cloud service that provides processing and computation services for mobile devices. In other embodiments, method 300 may be carried out at least in part by the capturing device, and/or in part by a remote device in two-way communication with the capturing device.

In operation 302, a video stream, such as may be captured by camera 104, is received along with correlated AR data from a capturing device, such as device 102. In some embodiments, the AR data may be at least partially directly measured by the capturing device, such as by utilizing a stereoscopic camera or one or more depth measuring sensors such as LIDAR, and/or may be computed from the video stream by an AR API on the capturing device. In other embodiments, at least some of the AR data may be computed by a remote server receiving the video stream. The AR data, in embodiments, includes both a point cloud for each frame of the video stream along with camera intrinsics, and camera pose data such as x-y-z movements, which may be detected by accelerometers, and three-axis rotations (pitch-roll-yaw), which may be detected by gyroscopes. The camera pose data may be at least partially measured by one or more spatial position sensors, such as spatial position sensor 106.

In operation 304, this video stream and AR data are used to generate a 3D mesh of the environment captured by the capturing device. The mesh is generated incrementally on the fly as data is received from the capturing device, so that as the capturing device moves about its environment, the 3D mesh is updated and expanded to include additional parts of the environment that had not previously been viewed. The mesh may be generated using process flow 200 depicted in FIG. 2, above, or by another suitable process that results in a progressively generated 3D mesh.

In operation 306, the AR data, and specifically, camera pose data, are used to determine the location of the capturing device within the 3D mesh generated as part of operation 304. In embodiments, a simultaneous localization and mapping (SLAM) algorithm may be used to construct the 3D mesh. A SLAM algorithm may be employed by a mesh generator, such as mesh generator 212 of process flow 200. SLAM algorithms provide for the construction and updating of a map of an environment from data from a capturing device, while also simultaneously allowing for tracking of the location of the capturing device within the constructed environment. Any suitable SLAM algorithm may be employed that suits a given implementation and provides for tracking the location of the capturing device within the 3D mesh. The specific method for capture of location and rotation of the onsite customer's device is detailed in the particular SLAM algorithm employed in a given embodiment. Specifically, in a typical SLAM algorithm, image and sensor data (which may include camera pose data) is employed to simultaneously understand the space around a capturing device, as well as the location of the capturing device within it. An example of one possible approach to determining the location of the capturing device is depicted in FIG. 4, discussed in greater detail below.

In operation 308, once the location of the capturing device within the 3D mesh is determined, it is then rendered into the 3D mesh using a graphic device or widget, or set of devices or widgets, that visualizes both the location of the capturing device, as well as its orientation, e.g. rotation and direction the camera is facing. This graphic device or widget may be rendered by the mesh generator as part of constructing the mesh, or separately by a camera position generator, such as camera position generator 218 of process flow 200. The graphic device will be discussed in greater detail below with reference to FIG. 5.

Finally, operations 304 to 308 may iterate 310 on a regular cycle as the capturing device continues to provide a video stream. The location of the graphic device or widget indicating the position of the capturing device is thus routinely updated or refreshed, as well as any indicated uncertainty (discussed with reference to FIG. 5) so that the indicated position and orientation of the capturing device moves within the 3D mesh in approximate correspondence with how the capturing device moves about its captured environment. As the capturing device moves to portions of its environment that have not previously been viewed, the 3D mesh may be progressively updated and expanded (as part of operation 304 and process flow 200) to include the newly captured portions of the capturing device's environment. In some embodiments, only operations 306 and 308 may regularly iterate to keep the location and orientation depicted by the graphic device in approximate sync with movements of the capturing device. Operation 304 may only be selectively iterated when it is detected that the capturing device has moved outside the portion of the 3D mesh already constructed, and so the video stream captures a new portion of the environment that is used to expand and update the 3D mesh that is being progressively generated. The speed at which operations 306, 308, and where appropriate, 304 are iterated may depend upon the capabilities of the various components involved, e.g. the processing power of the system that is generating the 3D mesh, the size/resolution of the video stream being supplied by the capturing device, the needs of a given implementation in terms of refresh rate, and/or any other relevant factors.

Figure 4:
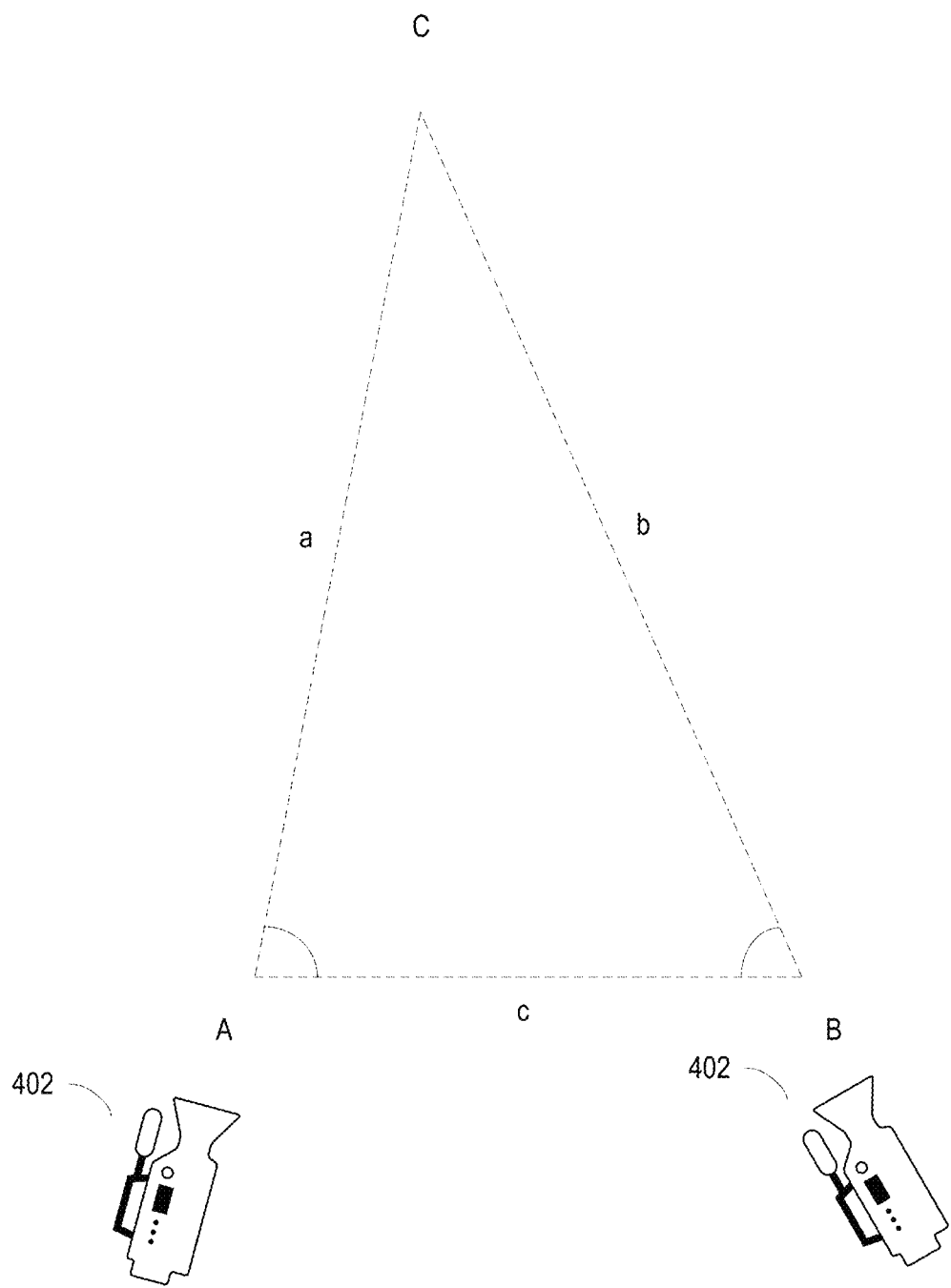
FIG. 4 is an example diagram of how the position of a capturing device may be determined with reference to a reference point or point of interest, according to various embodiments.

Turning to FIG. 4, an example is depicted of how the location of a capturing device can be determined within a mesh being generated from a video from the capturing device. The calculations described below with respect to FIG. 4 may be carried out by a mesh generator 212 or camera position generator 218 of process flow 200, such as part of the operations of method 300. In embodiments, a point of interest or reference point may be identified across two frames, a first and second frame, that are temporally proximate. The first and second frames within the sequence of frames of the video from the capturing device may be temporally proximate if they are temporally adjacent (the second frame is captured immediately following the first frame) or within a predetermined proximity, for example captured within one second of each other. Other embodiments may set different thresholds for when two frames are temporally proximate, depending upon the needs of a given implementation. Using camera pose data, in some embodiments, the distance the camera/capturing device moved between capture of the first and the second frames can be determined. Where the depth from the capturing device to the point of interest is known, viz. the point of interest corresponds to a point within the depth point cloud associated with the first and second frames, the distance from the camera to the point of interest may be triangulated, allowing the device's location relative to the point of interest to be understood. In some embodiments, the point of interest/reference point may move out of frame between the first frame and second frame, depending on the length of time between the first frame and the second frame.

For the example depicted in FIG. 4, a camera 402 of the capturing device is at a first position A in the first frame. Within view of camera 402 is point of interest or reference point C. Next, camera 402 has moved to a second position B in the second frame, with point of interest C still within frame. By using sensors equipped to the capturing device (such as sensors 106, discussed above with respect to FIG. 1) for example that include one or more accelerometers, a distance c can be directly measured. Distance c could be expressed as a vector, expressed as the direction that camera 402 travels from the first frame and the second frame coupled with its speed. Accelerometers can provide information on the direction and rate of acceleration of the vector representing c. By knowing the time difference between the first and second frames along with the direction and rate of acceleration measured by the accelerometers, an actual distance for c can be calculated within a degree of certainty depending upon the accuracy and sensitivity of the accelerometers. Knowledge of the location of point of interest C within the first frame and the vector of distance c allow the calculation of an angle A between the point of interest C, and the direction traveled by camera 402 between the first and second frames. Likewise, angle B can be calculated from the known position of the point of interest within the second frame and where camera 402 ends on the vector of distance C. From these two angles A and B, and the distance C, distances a and b from the camera 402 to the point of interest C can be computed.

With distances a and b, the position of camera 402 (and thus the capturing device) relative to point of interest C can be graphically represented. Once distance a is known, the position of camera 402 in the first frame can be depicted. Likewise, the position of camera 402 can updated from the first frame to the second frame once distance b is known. These computations can be combined with similar computations for additional reference points identified between the first frame and the second frame to allow cross-checking of position and improvement of positional accuracy. It should be understood that the designation of first and second frames is arbitrary; any two frames that share at least one common reference point can be used to determine the relative position of camera 402. As suggested by the iteration 310 of method 300, the position of camera 402 is updated continuously, such by camera position generator 218 or mesh generator 212, as frames are provided via a video stream from camera 402 and new reference points are identified in each frame.

This calculation of angles A and B and distance c is one possible technique. In some implementations, the capturing device may be able to directly measure distances and/or angular changes, which may be sensed by one or more gyroscopes (which may be part of sensors 106). For example, the capturing device may be equipped with distance sensing technology such as LI DAR, which allow for direct measurement of distances a and b. In some embodiments, the distances a and b may be calculated as part of the depth cloud associated with the first frame and second frame, respectively, such as by an AR API equipped to the capturing device. In such embodiments, the AR API may employ a technique as described above to calculate the distances a and b, where the capturing device is not equipped for direct distance measurement. Furthermore, it should be understood that these calculations may be made for multiple points of interest in a given frame, and are not limited to a single point of interest. Calculating the position of the capturing device relative to multiple points of interest can allow for cross-checking and increased precision of location, and/or can allow a determination of a possible range of inaccuracy.

Figure 5:
FIG. 5 depicts an example view of a 3D mesh generated from a capturing device that includes an indication of the position and orientation of the capturing device, according to various embodiments.

FIG. 5 depicts an example view of a 3D mesh that may be generated according to process flow 200 and method 300, along with a depiction of a graphic device or widget 500 that indicates the position and orientation of the capturing device. The graphic device or widget 500 may be rendered by mesh generator 212, camera position generator 218, or another part of process flow 200. Once information about the device's location and rotation is calculated and/or measured, represented as a vector and quaternion respectively, it can be synchronized over a network to a user of a remote device who may be viewing the 3D mesh, who can then visualize the location of the capturing device.

As can be seen, widget 500 depicts the location as an orange ball, with the rotation and orientation of the capturing device (i.e. the direction the camera of the capturing device is pointing, along with any pan or tilt) as a transparent orange cone projecting from the ball. In some embodiments, the size of the widget 500 may scale in size to reflect any uncertainty in position. For example, the ball may increase in size if the calculated inaccuracy or uncertainty of the position increases, with the size of the ball encompassing all possible locations that the capturing device could be located. Likewise, a more precise determination of location, with less uncertainty, can allow the ball to shrink in size, graphically indicating a greater confidence in the calculated position of the capturing device. Similarly, the cone indicating the rotation and orientation of the capturing device's camera, while nominally representing an approximation of the camera's angle of view (which may be based upon known camera parameters such as focal length), may change in size to reflect any possible imprecision or uncertainty about the actual rotation and orientation of the capturing device. It should be understood that the use of a ball and cone as widget 500 is only one possible embodiment; other graphical devices and shapes may be used in different colors, patterns, black and white, or greyscale schemes, depending upon the needs of a specific implementation.

Figure 6:
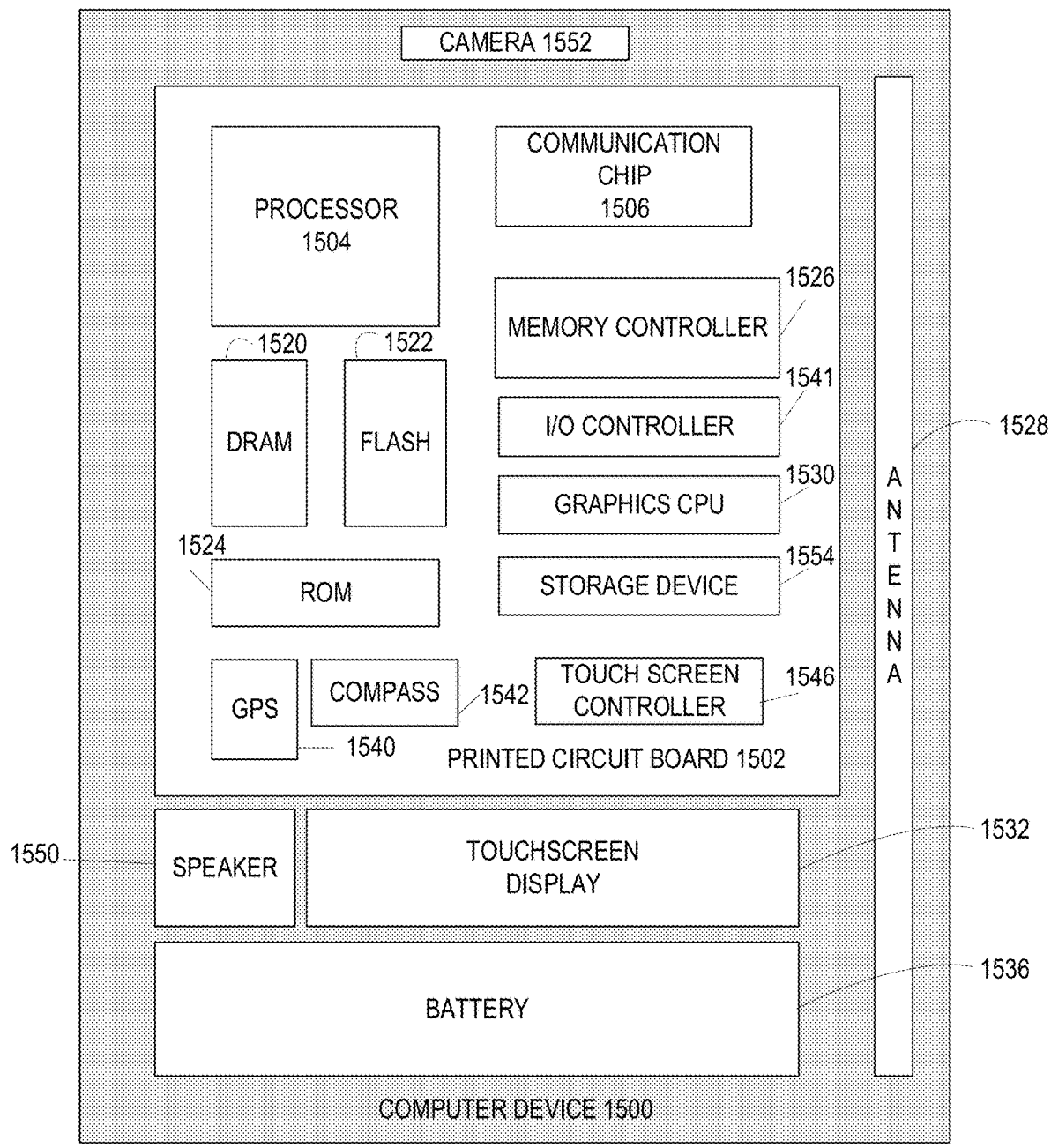
FIG. 6 is a block diagram of an example computer that can be used to implement some or all of the components of the system of FIG. 1, according to various embodiments.

FIG. 6 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of the system 100, process flow 200, and/or method 300, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) system 100, process flow 200, and/or method 300. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for representing a capturing device location within a 3D mesh, comprising:
   receiving, at a receiving device, a video stream and augmented reality (AR) data correlated to the video stream from the capturing device, the video stream and AR data representing an environment around the capturing device;
   generating incrementally, from the video stream and AR data, a 3D mesh representation of the environment;
   determining, from the video stream and AR data, a 3D location and a spatial orientation of the capturing device within the environment;
   indicating, on a display of the 3D mesh with a graphic widget, the 3D location and spatial orientation of the capturing device within the 3D mesh, the spatial orientation indicating the rotation and tilt of the capturing device on each of an X, Y, and Z axis; and
   updating, iteratively, the 3D location and spatial orientation of the capturing device within the 3D mesh.

2. The method of claim 1, wherein determining the 3D location of the capturing device within the environment comprises:
   determining a reference point within the environment that is in view of the capturing device;
   determining a distance from the capturing device from the reference point; and
   determining, from the AR data, the spatial orientation of the capturing device.

3. The method of claim 2, wherein determining the distance from the capturing device from the reference point comprises directly measuring the distance.

4. The method of claim 2, wherein determining the distance from the capturing device to the reference point comprises:
   determining, from a first frame of the video stream, a first position of the reference point within the first frame;
   determining, from a second frame of the video stream, a second position of the reference point within the second frame;
   determining, from the AR data, a change in the spatial orientation of the capturing device from a time the first frame is captured to a time the second frame is captured; and
   determining, from the change in the spatial orientation and first and second positions of the reference point, the distance from the capturing device to the reference point.

5. The method of claim 1, further comprising modifying the graphic widget indicating the 3D location and the spatial orientation of the capturing device within the 3D mesh to reflect an uncertainty in the 3D location and the spatial orientation.

6. A non-transitory computer readable medium (CRM) comprising instructions that, when executed by an apparatus, cause the apparatus to:
   receive a video stream and augmented reality (AR) data correlated to the video stream from a capturing device, the video stream and AR data representing an environment around the capturing device;
   generate incrementally, from the video stream and AR data, a 3D mesh representation of the environment;
   determine and update iteratively, from the video stream and AR data, a 3D location and a spatial orientation of the capturing device within the environment; and
   indicate and update iteratively, on a display of the 3D mesh with a graphic widget, the 3D location and spatial orientation of the capturing device within the 3D mesh, the spatial orientation indicating the rotation and tilt of the capturing device on each of an X, Y, and Z axis.

7. The non-transitory CRM of claim 6, wherein the instructions determine the 3D location of the capturing device by further causing the apparatus to:
   determine a reference point within the environment that is in view of the capturing device;
   determine a distance from the capturing device from the reference point; and
   determine, from the AR data, the spatial orientation of the capturing device.

8. The non-transitory CRM of claim 7, wherein the distance from the capturing device to the reference point is determined by direct measurement.

9. The non-transitory CRM of claim 7, wherein the instructions cause the apparatus to determine the distance by causing the apparatus to:
   determine, from a first frame of the video stream, a first position of the reference point within the first frame;
   determine, from a second frame of the video stream, a second position of the reference point within the second frame;
   determine, from the AR data, a change in the spatial orientation of the capturing device from a time the first frame is captured to a time the second frame is captured; and
   determine, from the change in the spatial orientation and the first and second positions of the reference point, the distance to the reference point.

10. The CRM of claim 6, wherein the instructions are to further cause the apparatus to modify the graphic widget that indicates the 3D location and the spatial orientation of the capturing device within the 3D mesh to reflect an uncertainty in the 3D location and the spatial orientation.

11. A system for representing a capturing device within a 3D mesh, comprising:
    a display; and
    a processor, wherein the processor is configured to:
       generate, from a video stream and AR data, a 3D mesh of an environment represented by the video stream and AR data,
       determine and iteratively update, from the video stream and AR data, a 3D location and a spatial orientation of one or more sensors supplying the video stream and AR data, and
       display and iteratively update, on the display with a graphic widget, the 3D mesh and the 3D location and spatial orientation of the one or more sensors within the 3D mesh, the spatial orientation indicating the rotation and tilt of the one or more sensors on each of an X, Y, and Z axis.

12. The system of claim 11, wherein the display, the processor, and the one or more sensors comprise a single apparatus.

13. The system of claim 11, wherein the display and the processor are remote from the one or more sensors.

14. The system of claim 13, wherein the one or more sensors comprise a mobile device, and the mobile device is in communication with the processor over a network.

15. The system of claim 11, wherein the processor is further configured to:
   determine, from a first frame of the video stream, a first position of the reference point within the first frame;
   determine, from a second frame of the video stream, a second position of the reference point within the second frame; and
   determine, from the AR data, a change in the spatial orientation of the capturing device from a time the first frame is captured to a time the second frame is captured.

16. The apparatus of claim 11, wherein the processor is further configured to modify the graphic widget that indicates the 3D location and the spatial orientation of the one or more sensors within the 3D mesh to reflect an uncertainty in the 3D location and the spatial orientation.

* * * * *